United States Patent [19]

Heck et al.

[11] Patent Number: 5,066,026
[45] Date of Patent: Nov. 19, 1991

[54] GAS FACE SEAL

[75] Inventors: John A. Heck, Timonium; H. Randall Wilhelm, Baltimore, both of Md.

[73] Assignee: Kaydon Corporation, Muskegon, Mich.

[21] Appl. No.: 535,906

[22] Filed: Jun. 11, 1990

[51] Int. Cl.⁵ .............................................. F16J 15/34
[52] U.S. Cl. .................... 277/96.1; 277/93 R; 277/93.5 D
[58] Field of Search ............... 277/96.1, 93 R, 93.5 D, 277/3, 27

[56] References Cited

U.S. PATENT DOCUMENTS

| | | |
|---|---|---|
| 845,701 | 2/1907 | Moore . |
| 1,876,515 | 9/1932 | Emmet . |
| 1,876,520 | 9/1932 | Newkirk et al. . |
| 2,402,033 | 6/1946 | Flinn .............................. 277/96.1 |
| 3,109,658 | 11/1963 | Barrett et al. . |
| 3,347,552 | 10/1967 | Frisch . |
| 3,408,085 | 10/1968 | Van Spijk et al. . |
| 3,499,653 | 3/1970 | Gardner . |
| 3,527,465 | 9/1970 | Guinard . |
| 3,575,424 | 4/1971 | Taschenberg . |
| 3,640,541 | 2/1972 | Taschenberg . |
| 3,695,789 | 10/1972 | Jansson . |
| 3,744,805 | 7/1973 | Heinrich . |
| 3,767,212 | 10/1973 | Ludwig . |
| 4,212,475 | 7/1980 | Sedy . |
| 4,335,888 | 6/1982 | Ohba et al. . |
| 4,376,540 | 3/1983 | Kotzur et al. . |
| 4,398,730 | 8/1983 | Rucker et al. . |
| 4,406,466 | 9/1983 | Geary, Jr. ........................ 277/96.1 |
| 4,407,512 | 10/1983 | Trytek . |
| 4,420,162 | 12/1983 | Yanai et al. . |
| 4,421,321 | 12/1983 | Lipschitz ........................ 277/96.1 |
| 4,447,063 | 5/1984 | Kotzur et al. . |
| 4,733,873 | 3/1988 | Takenaka ........................ 277/96.1 |
| 4,738,453 | 4/1988 | Ide . |
| 4,792,146 | 12/1988 | Lebeck et al. . |
| 4,836,561 | 6/1989 | Lebeck et al. . |

FOREIGN PATENT DOCUMENTS

| | | | |
|---|---|---|---|
| 0737230 | 12/1932 | France ............................. 277/96.1 |
| 0920892 | 3/1963 | United Kingdom ............ 277/96.1 |
| 2197396A | 5/1988 | United Kingdom . |

OTHER PUBLICATIONS

Brochure entitled "Kaydon Dry Gas Seals", by Kaydon Ring & Seal, Inc. (Date unknown).
Drawing entitled "Koppers Shoulder", dated Nov. 11, 1986.

Primary Examiner—William A. Cuchlinski, Jr.
Assistant Examiner—Daniel G. DePumpo
Attorney, Agent, or Firm—Price, Heneveld, Cooper, DeWitt & Litton

[57] ABSTRACT

The gas face seal includes a housing defining an annular cavity, an annular face seal ring fixed to the housing for limited axial movement within the cavity, an opposed annular shoulder and a retainer for fixing the annular shoulder to a shaft for rotation therewith. The shoulder and face seal ring define opposed, radially extending surfaces. One of the surfaces includes a plurality of equally spaced, circumferentially extending inclined recesses. The surface further defines a plurality of radially extending feed slots which open through an outside diameter of the shoulder or face seal ring. In one embodiment, the inclined recesses extend circumferentially in both directions from the radially extending slots and the seal is bidirectional.

20 Claims, 4 Drawing Sheets

GAS FACE SEAL

BACKGROUND OF THE INVENTION

The present invention relates to rotary mechanical seals and more particularly to gas face seals.

Rotary mechanical seals are used in a wide variety of rotary shaft devices including blowers, compressors, vacuum pumps and expanders. The seals provide a barrier between the gas working chamber and the external environment. The seals minimize loss of working fluid to the environment. These seals are positioned at the interface or penetration of the rotating shaft with the stationary working chamber or housing. Mechanical seals may be of the circumferential type or of the face type or controlled gap type.

A wide variety of face seals have heretofor been proposed. These seals generally include a shoulder or sealing element fixed to the rotating shaft so as to rotate therewith. A nonrotating seal element or face seal ring is supported on the housing and restrained so as to be nonrotatable. The shoulder and face seal ring define opposed sealing faces or surfaces. Provision is made for urging the surfaces towards one another.

Operation of such seals requires that a small but finite gap or separation be maintained between the opposed sealing surfaces. The finite gap is achieved by a combination of hydrostatic and hydrodynamic gas forces. An example of a gas seal may be found in U.S. Pat. No. 3,499,653 entitled ROTARY MECHANICAL SEAL OF THE GAP TYPE and which issued on Mar. 10, 1970 to Gardner. The seal disclosed therein includes a rotor or shoulder mounted on a shaft and defining a radially disposed sealing surface. A seal ring is urged towards the rotor by a plurality of springs. The seal face of the seal ring defines a plurality of spiral grooves. The grooves create a hydrodynamic lift to create the gap or separation between the opposed sealing elements. Examples of other gas seals may be found in U.S. Pat. No. 3,640,541 entitled HYDRODYNAMIC LIFT-TYPE FACE SEAL and which issued on Feb. 8, 1972 to Taschenberg and U.S. Pat. No. 4,212,475 entitled SELF ALIGNING SPIRAL GROOVE FACE SEAL and which issued on Jul. 15, 1980 to Sedy.

SUMMARY OF THE INVENTION

In accordance with the present invention, a unique gas face seal is provided. The seal includes an annular shoulder and an opposed annular face seal ring. Provision is made for fixing the shoulder to a rotating shaft and for nonrotatably fixing the face seal ring to a housing. One of the surfaces of the shoulder and ring defines a plurality of spaced, circumferentially extending, inclined recesses angled inwardly from the surface in the direction of relative rotation of the surface. In the preferred form, a plurality of feed slots are defined by the surface. Each slot intersects one of the inclined recesses at the point of maximum depth of the recess. Also, each of the inclined recesses is shrouded so as to be surrounded circumferentially and radially by planar or unrelieved surfaces. In another embodiment, each feed slot is intersected by a pair of circumferentially extending inclined recesses. In such embodiment, the seal is bidirectional.

DETAILED DESCRIPTION OF THE PREFERRED EMBODIMENT

Figure 1:
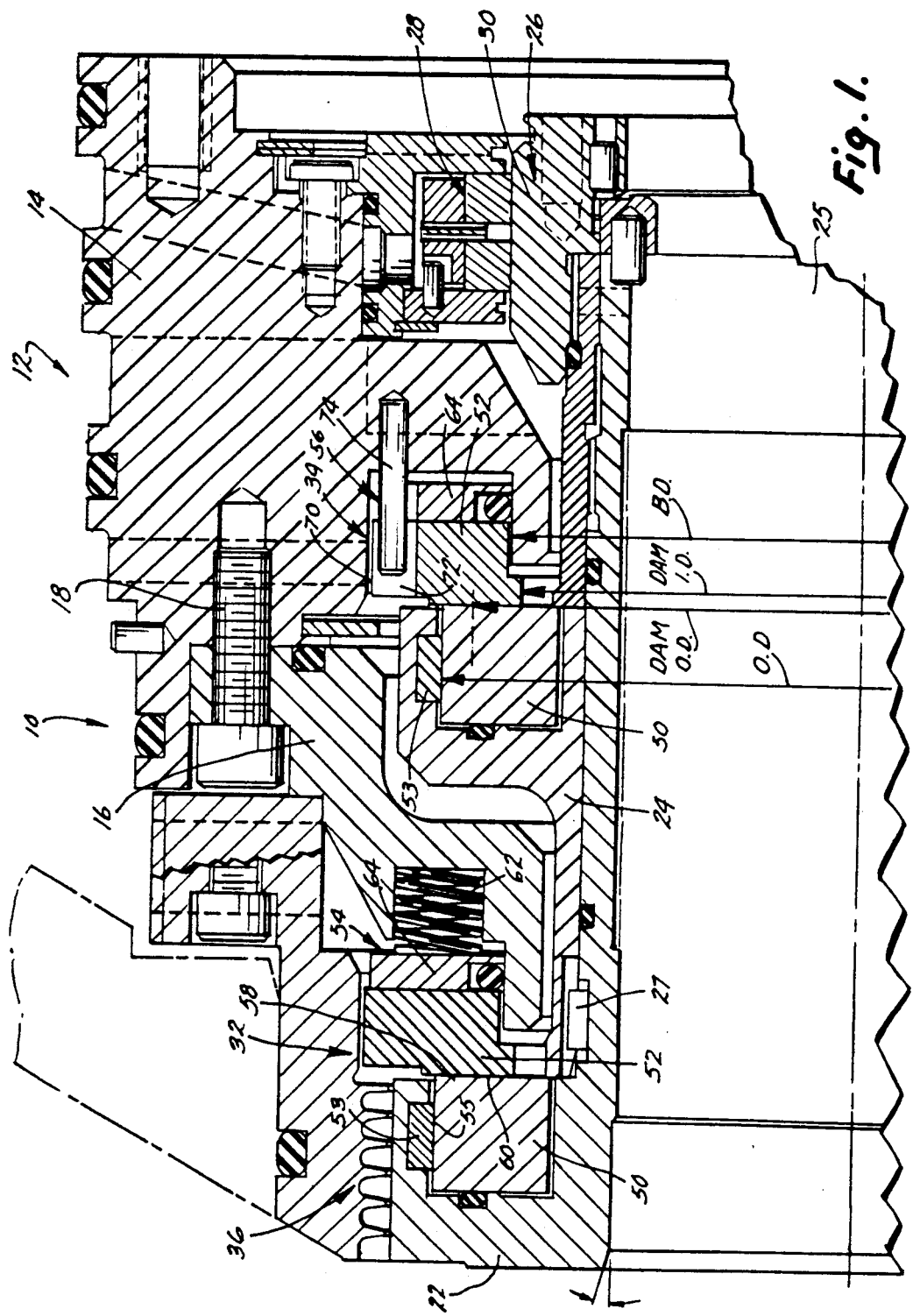
FIG. 1 is a fragmentary, radial cross-sectional view through a gas face seal in accordance with the present invention.

A seal assembly in accordance with the present invention is illustrated in FIG. 1 and generally designated by the numeral 10. Assembly 10 includes an annular housing subassembly 12. Subassembly 12 includes a main housing 14 and a face seal housing 16. Housing 16 is secured to housing 14 by a plurality of fasteners 18. Housing subassembly 12 is adapted to be secured to a housing of a rotary shaft device such as a gas compressor.

Assembly 10 further includes shoulder retainers 22, 24. Retainer 22 is mounted on a rotating shaft 25 of the device. Shoulder retainer 24 rotates with retainer 22 through keys 27. A suitable sleeve subassembly 26 engages the shoulder retainers. In addition, a barrier seal ring subassembly 28 may be positioned between housing 14 and a sleeve 30.

In the embodiment shown in FIG. 1, a pair of axially spaced gas face seal subassemblies 32, 34 are included. In addition, a labyrinth seal 36 is secured to housing subassembly 12. Seal assemblies 32, 34 seal a working chamber which is disposed to the left when viewed in FIG. 1 from the external environment which is disposed to the right. A buffer gas may be introduced into the seal area through suitable porting. The buffer gas is typically at a pressure of about 20 p.s.i. above working pressure. The buffer gas can escape into the working gas through the labyrinth seal. The buffer gas may also escape through the gas seals 32, 34. Depending upon the application, only a single such gas seal may be needed. In addition, the labyrinth seal and/or the barrier seal subassembly may also be eliminated. In an alternative embodiment, two seal assemblies may be positioned opposite one another with buffer gas injected between them.

Figure 2:
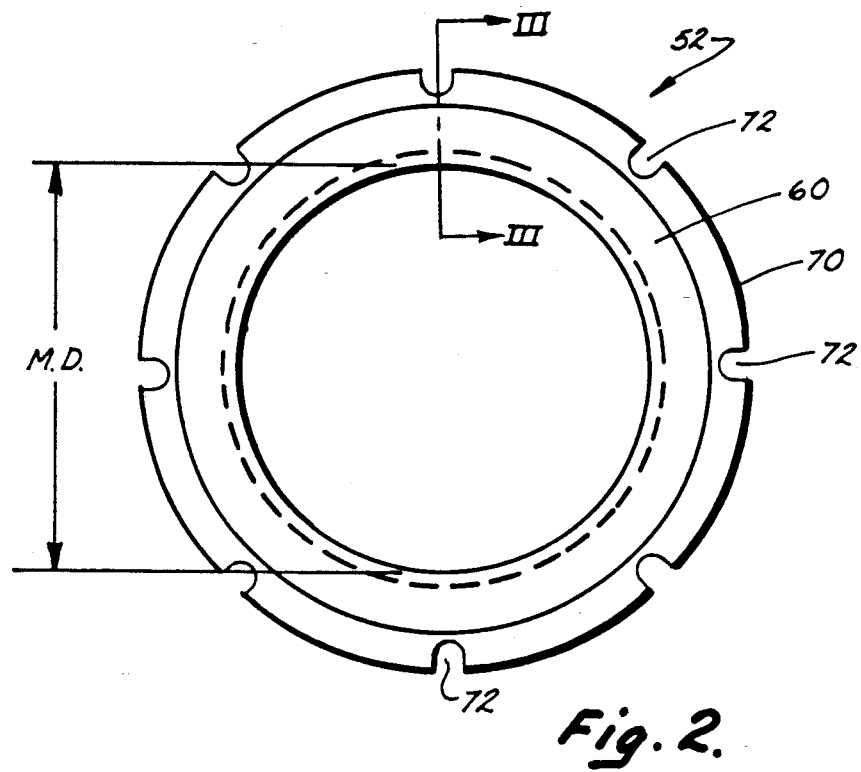
FIG. 2 is a front, elevational view of a face seal ring incorporated in the present invention.
Figure 3:
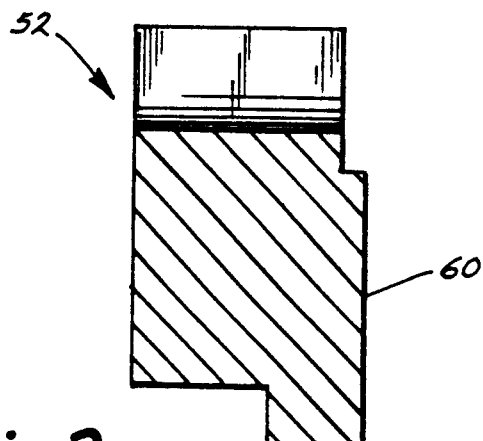
FIG. 3 is a cross-sectional view taken generally along line III—III of FIG. 2.

Each seal assembly 32, 34 includes a rotating element or shoulder 50 and a nonrotating element or face seal ring 52. Each shoulder 50 is secured to its respective retainer by a plurality of keys 53. Keys 53 engage flats 55 defined by shoulder 50. Face seal rings 52 are retained within recesses or cavities 54, 56, defined at least in part by the housing subassemblies 14, 16. The shoulder defines a sealing face or generally planar surface 58 and each ring 52 defines an opposed planar sealing surface 60. Ring 52 and hence surface 60 is resiliently biased towards its cooperating shoulder by a plurality of compression springs 62 in a conventional fashion. Each compression spring 62 engages a follower or backup ring 64 which in turn engages seal ring 52. As seen in FIGS. 1 and 2, the outer circumferential face or surface 70 of seal ring 52 defines a plurality of circumferentially spaced lock pin recesses 72. A plurality of lock pins 74 fixed to housing subassembly 12 extend within recesses 72. The pins, therefore, prevent relative rotation of rings 52 with respect to their shoulders. Limited axial movement is, however, permitted. The sealing surface or face 60 of ring 52 is generally flat or planar. In the alternative, the surface may be slightly convex. Ring 52 in cross-section has a step configuration (FIG. 3).

Figure 4:
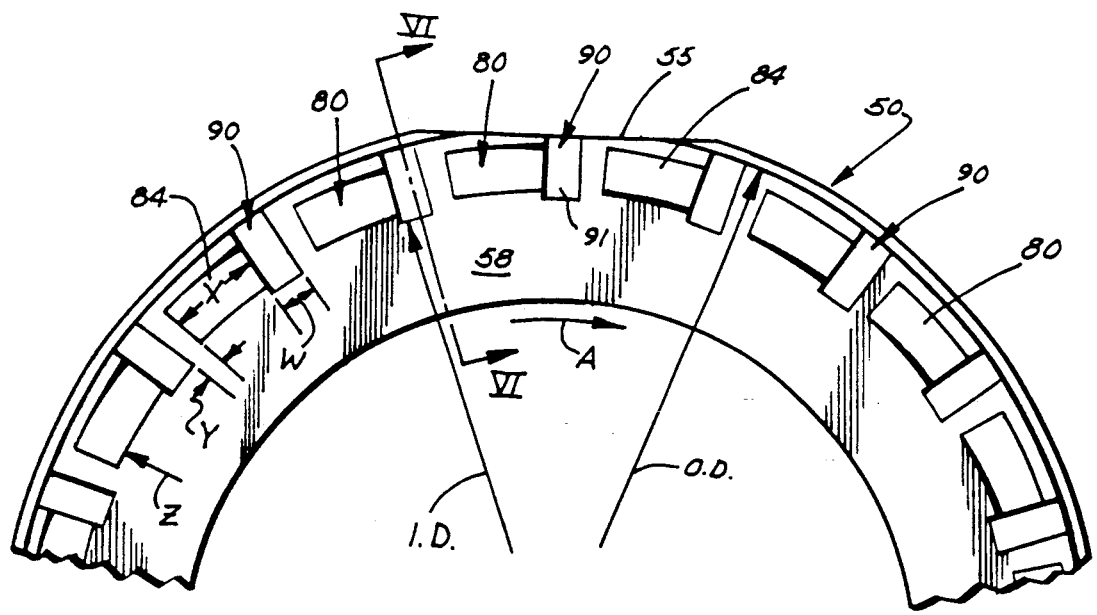
FIG. 4 is a fragmentary, front elevational view of a shoulder incorporated in the present invention.
Figure 5:
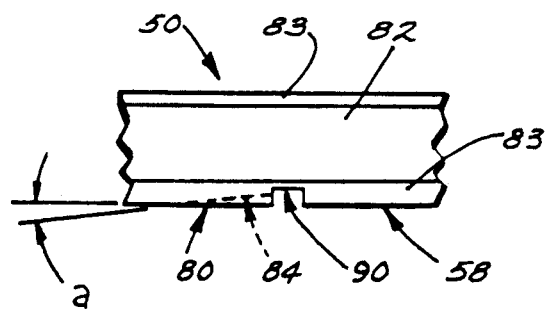
FIG. 5 is a fragmentary, top plan or outer circumferential face view of the shoulder 4 of FIG. 4.
Figure 6:
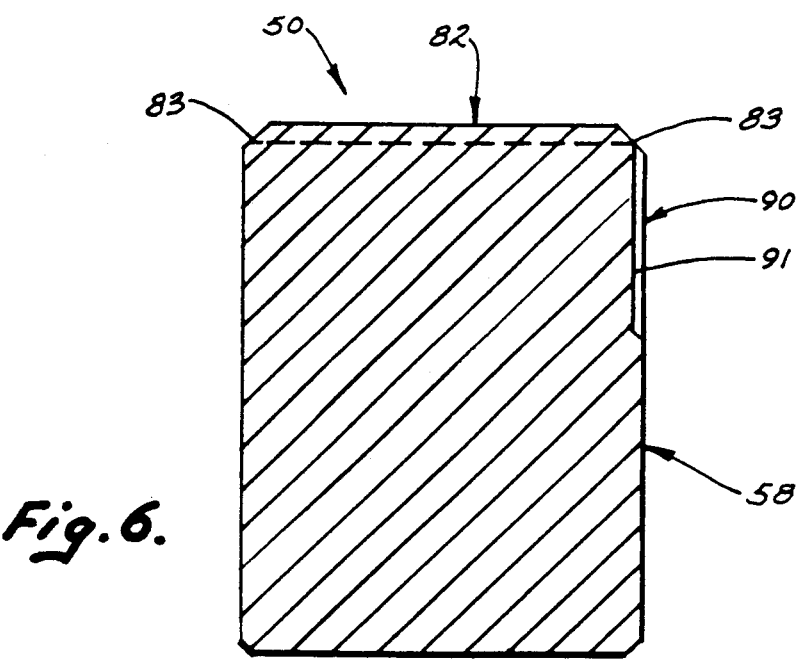
FIG. 6 is an enlarged cross-sectional view taken generally along line VI—VI of FIG. 4.

Shoulder 50 is best seen in FIGS. 4, 5 and 6. As shown, planar sealing surface 58 defines a plurality of equally spaced, circumferentially extending recesses 80. Recesses 80 are positioned radially inwardly from an outer circumferential surface 82 of the shoulder. Surface 82, as seen in FIG. 6, includes chamfered portions 83. In the preferred form, recesses 80 are equally spaced along a common circle. Each recess is inclined inwardly from surface 58 as best seen in FIG. 5. Each recess 80 includes a base or bottom 84 which is inclined inwardly at an angle "a".

Shoulder 50 further defines a plurality of feed or radial slots 90. Each slot 90 intersects a corresponding recess 80 at a position of maximum depth of the recess (FIG. 5). Radial slots 90 each open through chamfered portions 83 of circumferential outer surface 82 and hence through an outer diameter of the shoulder. As shown, slots 90 also extend radially inwardly from recesses 80. Slots 90 have a planar or flat bottom 91. In the preferred form, each of the recesses 80 is bounded by or surrounded by unrelieved portions of planar surface 58 on the remaining three surfaces. The recesses ar hence shrouded radially outwardly, radially inwardly and circumferentially between adjacent slots 90. Each recess has a circumferential dimension "X" and a radial width dimension "Z". The unrelieved surface between each recess 80 and an adjacent slot has a circumferential dimension "Y" (FIG. 4).

The angle of inclination "a" of each recess is less than 12 minutes or 0.20 degrees. In an existing embodiment, angle "a" is about 0.050°. The ratio of the circumferential length of each recess to the combined circumferential length of the recess plus the length of the unrelieved surface, namely, X/(X+Y) is within the range of 0.2 to 1.0. It is presently preferred that this ratio be about 0.5. The ratio of the circumferential length of the recess X to the radial width Z of the recess, namely, X/Z is greater than 0.5. It is preferred that this ratio be about 1.0. The depth of recess 80 at its intersection with the radial slot or hence the maximum depth of the recess (FIG. 5) is within the range of 0.0001 to 0.0008 inches. In an existing embodiment, such depth is 0.00029±0.00005 inches. The shrouding around each recess is at least 0.010 inches in each direction. The maximum depth of each radial slot is at least ten times the maximum depth of each recess. In an existing embodiment, such depth is about 0.005 inches. The circumferential width "W" of each slot is preferably at least five times the depth of the slot. In an existing embodiment, "W" is about 0.136 inches.

Axial balance of hydrostatic gas forces on the face seal ring 52 is established by the relationship between the balance diameter "BD", namely the diameter of the housing portion which receives the face seal ring (FIG. 1), the minor diameter "MD" of the sealing interface (FIG. 2), the diameter "ID" of the circle inscribed by the radially inward most point of the radial slots (FIG. 4) and the outermost diameter "OD" of the sealing interface (FIG. 4). The balance ratio of the gas seal ring in accordance with the present invention is defined as follows: (ID−BD)/(ID−MD). In the preferred form, the balance ratio of the gas seal is within the range of 0.5 to 0.8. The shoulder and face seal ring are fabricated using conventional techniques. The shoulder may be made from a carbide such as silicon carbide and the ring may be made from carbon.

In the embodiment of FIGS. 1-6, the inclined recesses in conjunction with the radially extending feed slots generate the hydrodynamic forces which create a gap or separation between the faces of the shoulder and seal ring. The generation of these forces is rotation dependent. In order to create the separation, shoulder 50 must rotate in the direction of arrow "A" when viewed in FIG. 4. In other words, the shoulder must be rotated in a direction pointing from the start of the inclined recess to the maximum depth of the recess.

Figure 7:
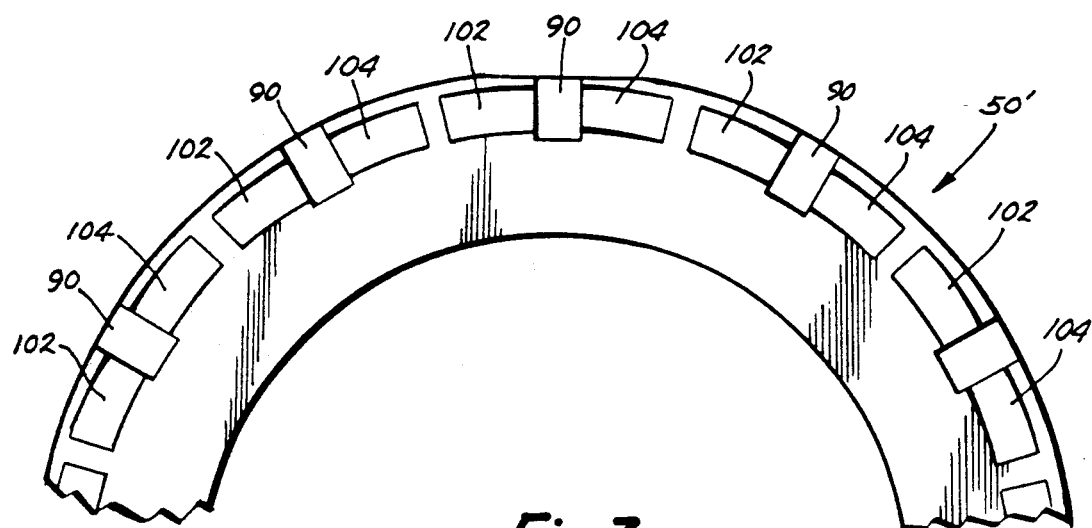
FIG. 7 is a fragmentary, front elevational view of an alternative embodiment of the shoulder in accordance with the present invention.
Figure 8:
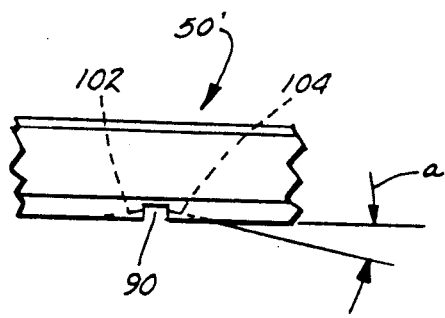
FIG. 8 is a top, plan view showing a portion of the outer circumferential face of the shoulder of FIG. 7.

FIGS. 7 and 8 illustrate an alternative embodiment of the shoulder 50' which is not rotationally dependent. In this embodiment, each radial feed slot 90 intersects a pair of oppositely directed or first and second sets of inclined recesses 102, 104. Radial slots 90 intersect each recess 102, 104 at their points of maximum depth. The dimensional relationship between the 102, 104 and slot 90 are the same as between recesses 80 and slots 90 of the embodiment of FIG. 4. In this embodiment, however, the hydrodynamic forces are generated regardless of the direction of rotation of the shoulder. Potential dangers associated with backward installation or shaft rotation reversals are eliminated.

The gas seal in accordance with the present invention maintains an extremely small but finite separation between the rotating shoulder and the face seal ring on the order of 0.0001 inches. This separation is achieved through a combination of hydrostatic and hydrodynamic gas forces. The hydrodynamic forces are derived from the planar or slightly convex seal surface of the face seal ring and the uniquely and precisely configured recesses and slots formed in the sealing surface of the shoulder. The seal in accordance with the present invention is capable of reliable and successful long-term operation. The seal finds wide applicability in rotating shaft equipment used for example, in the petrochemical industry. Such includes blowers, centrifugal, axial flow or screw compressors, vacuum pumps or expanders. The seal minimizes exchange of working fluid with the environment. The seal may be used individually or in multiple sets depending upon the particular application.

In view of the above description, those of ordinary skill in the art may envision various modifications which would not depart from the inventive concepts disclosed. It is expressly intended, therefore, that the above description should be considered as only that of the preferred embodiment. The true spirit and scope of the present invention may be determined by reference to the appended claims.

The embodiments of the invention in which an exclusive property or privilege is claimed are defined as follows:

1. A gas face seal for sealing the interface between a rotating shaft and a housing, said seal comprising:
   an annular shoulder having a generally planar, radially extending face;

retainer means connected to the shoulder for retaining the shoulder on the shaft for rotation therewith;

an annular face seal ring having a radially extending generally planar seal face;

lock means engaging the face seal ring for locking the face seal ring to the housing while permitting axial motion towards and away from the face of the shoulder; and resilient means engaging said face seal ring for resiliently biasing said face seal ring towards said shoulder, one of said radially extending face and said seal face defining a set of a plurality of spaced, circumferentially extending inclined recesses, each of said recesses having a circumferentially inclined base angled axially inwardly in the direction of relative rotation of said one of said faces to form a smooth transition therewith, said recesses being shrouded and separated by unrelieved planar surfaces and wherein said inclined recesses each have an angle of inclination "a" greater than 0 and approximately 0.2° or less and a maximum depth within the range of 0.0002 inches to 0.0008 inches, and wherein each of said recesses has a circumferential length "X" and said recesses are separated by an unrelieved surface having a circumferential length "Y" and wherein the ratio X/(X+Y) is within the range of 0.2 to 1.0 and wherein each of said recesses is shrouded radially inwardly, radially outwardly and circumferentially at one side of the recess.

2. A gas face seal as defined by claim 1 wherein said recesses are defined by said face of said shoulder, said face of said shoulder further defining a plurality of radially extending slots, each slot intersecting one of said inclined recesses at a point of maximum depth of the inclined recesses.

3. A gas face seal as defined in claim 2 wherein the balance ratio of said seal is within the range of 0.5 to 0.80.

4. A gas face seal as defined in claim 2 wherein said radially extending slots each open through an outer diameter of said shoulder.

5. A gas face seal as defined in claim 4 further including a second set of circumferentially extending recesses, each recess of said second set having an inclined base extending circumferentially from a point of maximum depth at one of said slots in a direction opposite said recesses of said set of recesses.

6. A gas face seal as defined in claim 5 wherein the depth of each of said slots is at least ten times the maximum depth of each recess and wherein each slot has a circumferential width "W" of at least five times its depth.

7. A gas face seal as defined in claim 5 wherein each of said recesses has a radial width "Z" and wherein the ratio X/Z is greater than 0.5.

8. A gas face seal as defined in claim 2 wherein the depth of each of said slots is at least ten times the maximum depth of each recess and wherein each slot has a circumferential width "W" of at least five times its depth.

9. A gas face seal as defined in claim 8 wherein each of said recesses has a radial width "Z" and wherein the ratio X/Z is greater than 0.5.

10. A gas face seal as defined in claim 9 wherein the shrouding around each recess is at least 0.010 inches.

11. A gas face seal as defined in claim 10 wherein the depth of each of said slots is at least ten times the maximum depth of each recess and wherein each slot has a circumferential width "W" of at least five times its depth.

12. A gas face seal as defined in claim 11 wherein each of said slots extends radially inward of said recesses.

13. A gas face seal as defined in claim 12 wherein the balance ratio of said seal is within the range of 0.5 to 0.80.

14. A gas face seal as defined in claim 12 further including a second set of circumferentially extending recesses, each recess of said second set having a inclined base extending circumferentially from a point of maximum depth at one of said slots in a direction opposite said recesses of said set of recesses.

15. A gas face seal as defined in claim 14 wherein the balance ratio of said seal is within the range of 0.5 to 0.80.

16. An annular seal element for use in a gas face seal for sealing the interface of a rotating shaft with a housing, said seal element comprising:

an annular seal member defining a seal face having a generally planar, radially and circumferentially extending surface, said member defining a plurality of spaced circumferentially extending shrouded recesses, each recess being inclined inwardly from the surface to form a smooth transition therewith, said member further defining a plurality of radially extending feed slots, each slot intersecting one of said recesses and opening through a circumferential outer surface of said member, said inclined recesses each having an angle of inclination "a" greater than zero and approximately 0.2° or less and a maximum depth within the range of 0.0001 inches to 0.0008 inches, and wherein each of said recesses has a circumferential length "X" and said recesses are separated by the unrelieved surface having a length "Y" and wherein the ratio X/(X+Y) is within the range of 0.2 to 1.0 and wherein each of said recesses is shrouded radially inwardly, radially outwardly and circumferentially at one side of the recess.

17. An annular seal element as defined by claim 16 wherein each of the recesses extends circumferentially along a common circle.

18. An annular seal element as defined in claim 17 wherein each of said recesses has a radial width "Z" and wherein the ratio X/Z is greater than 0.5.

19. An annular seal element as defined in claim 16 wherein the depth of each of said slots is at least ten times the maximum depth of each recess and wherein each slot has a circumferential width of at least five times its depth.

20. An annular seal element as defined in claim 19 further including a second set of circumferentially extending recesses, each recess of said second set having an inclined base extending circumferentially from a point of maximum depth at one of said slots in a direction opposite said set of said recesses.

* * * * *

UNITED STATES PATENT AND TRADEMARK OFFICE
CERTIFICATE OF CORRECTION

PATENT NO. : 5,066,026

DATED : November 19, 1991

INVENTOR(S) : Heck et al.

It is certified that error appears in the above-identified patent and that said Letters Patent is hereby corrected as shown below:

Column 3, line 35;

"recesses ar" should be --recesses are--.

Column 4, line 29;

Before "102, 104" insert --recesses--.

Column 5, line 22;

"0.0002" should be --0.0001--.

Column 6, line 16, claim 14;

"a inclined" should be --an inclined--.

Signed and Sealed this

Fourth Day of May, 1993

Attest:

MICHAEL K. KIRK

Attesting Officer

Acting Commissioner of Patents and Trademarks